Dec. 11, 1945.  W. E. McCAULEY ET AL  2,390,843
METHOD AND MACHINE FOR VAPORIZING INSECTICIDES AND OTHER LIQUIDS
Filed Oct. 3, 1941  2 Sheets-Sheet 2
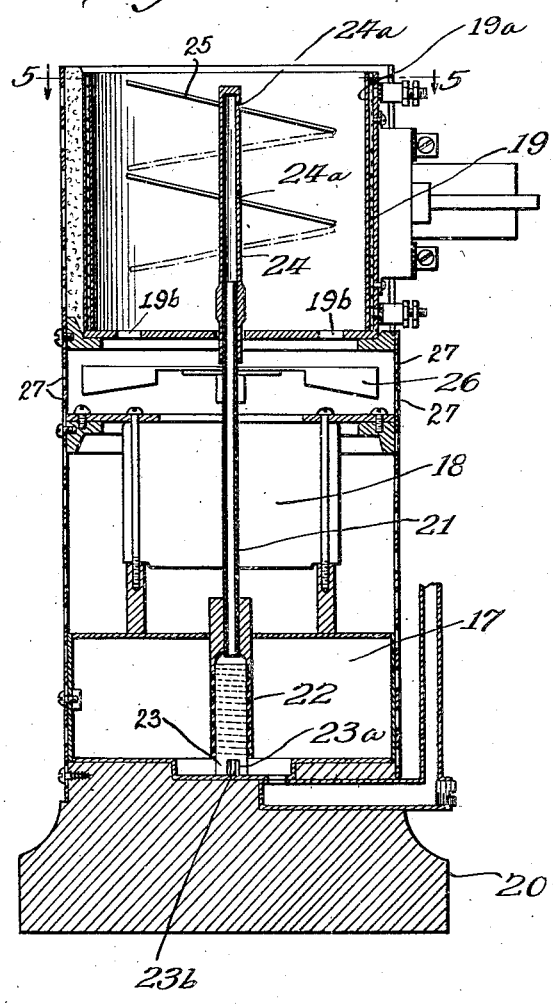
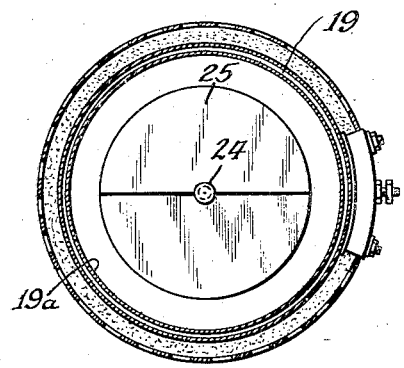
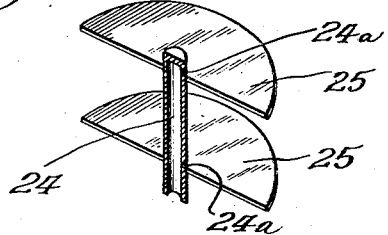
Inventors
William Edward McCauley,
Carlos W. Veach
By Denton Baker Attorney.

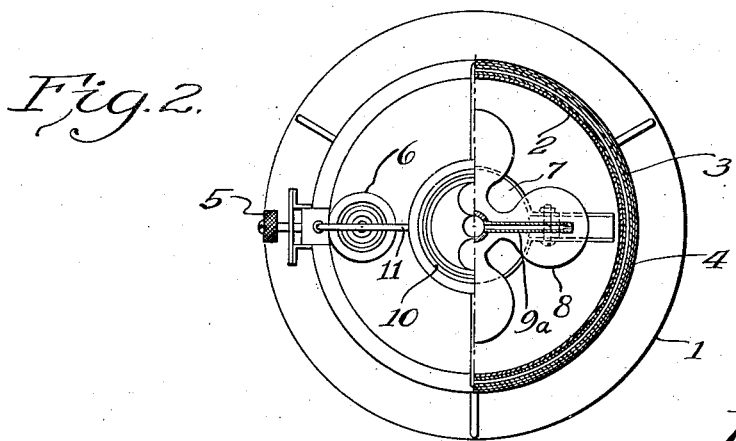
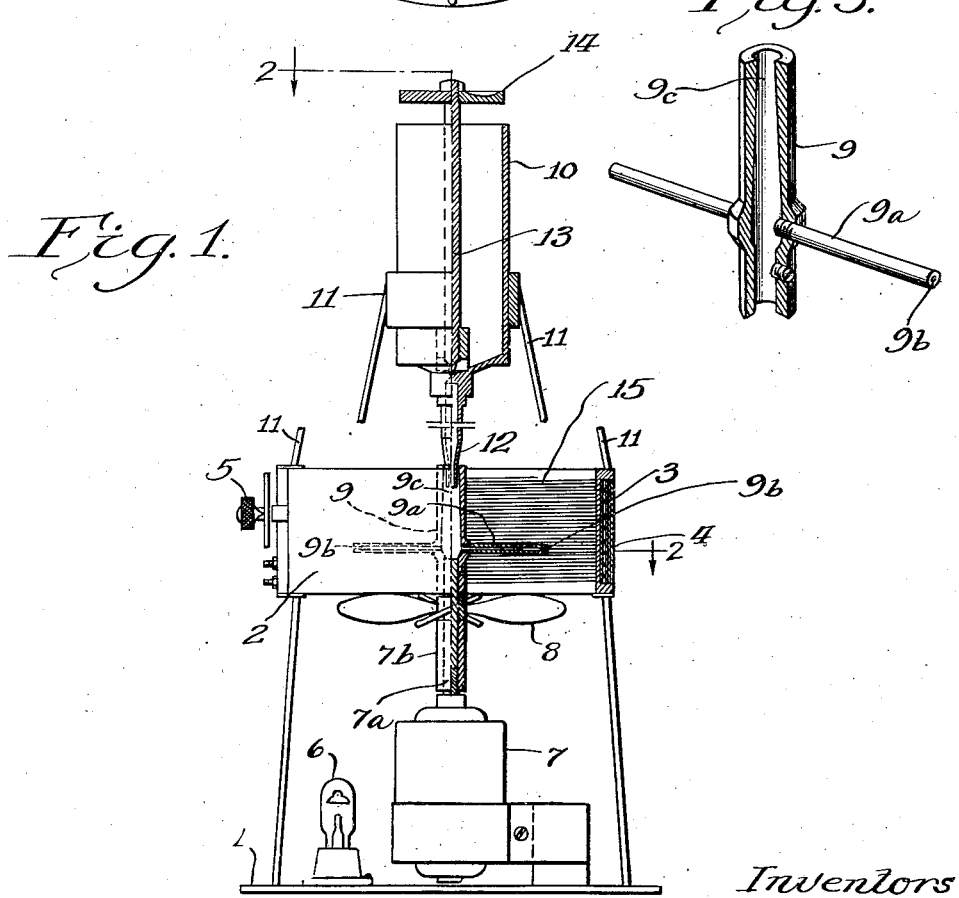

Patented Dec. 11, 1945

2,390,843

UNITED STATES PATENT OFFICE 2,390,843

METHOD AND MACHINE FOR VAPORIZING INSECTICIDES AND OTHER LIQUIDS

William Edward McCauley, Champaign, Ill., and Carlos W. Veach, Riverside, Calif., assignors to Board of Trustees of the University of Illinois, Urbana, Ill.

Application October 3, 1941, Serial No. 413,446

6 Claims. (Cl. 21—58)

The object of the invention is to provide an improved method and machine for rapidly vaporizing liquids and solutions, particularly insecticides and especially those which are relatively nonvolatile. This is accomplished by regulated distribution of suitable material upon a hot plate, preferably cylindrical, and projecting the resulting vapor into the atmosphere by means of a fan or other suitable means.

By this method it is possible to produce a fog of insecticidal vapor which will extend throughout the entire atmosphere of a room and remain suspended for a considerable time and thus insure the destruction of insects and other organisms without movement of the machine. An example of the efficiency of the method is afforded by the fact that the application of 250 cc. "Lethane 384" (regular) dispersed in a dairy barn of 35,000 cu. ft. resulted in a 99.9% knockdown of all house flies within 30 minutes without moving the machine. The method and machine are also well adapted for outdoor use.

Other advantages of our method and machine lie in the conversion of liquids and solutions to the vapor phase without the use of a compressor and without decomposition of the material, the elimination of diluting oils required when mechanical sprayers are used, adaptability to a variety of materials by mere regulation of temperature, and substantial saving of labor and material.

In the drawings:

Figure 1 is a side elevation of our machine with the right half in central vertical section.

Figure 2 is a plan view of our machine with the right half in horizontal section along the line 2—2 of Figure 1.

Figure 3 is a perspective view of the distributor 9 shown in Figures 1 and 2, partially in section.

Figure 4 is a side elevation, with the right half in central vertical section, of an alternative form of our machine.

Figure 5 is a plan view of the machine shown in Figure 4 with the right half in horizontal section through the line 5—5 of Figure 4.

Figure 6 is a perspective view of the distributor 24 shown in Figure 4 and 5, partially in section.

Referring to the drawings, mounted on support 1 is metallic, internally grooved, cylindrical hot plate 2 about which is wound an electrical resistance coil 3 which is connected with a suitable source of electricity, the coil and external surface of the plate being covered by insulation 4. An adjustable thermostat 5 is included in the electrical circuit for controlling the temperature of the plate 2. A pilot light 6 is connected with the thermostat 5 to indicate its operation. A motor 7 of regulable speed having a vertically extending rotatable shaft 7a, provided with a housing 7b, is mounted on the base of support 1, the position of the motor being such that the upper portion of shaft 7a will be centrally disposed with respect to the plate 2. Fixedly mounted on shaft 7a near the lower edge of the plate 2 is fan 8. Also fixedly mounted on the upper end of shaft 7a, somewhat above the lower edge of plate 2, is distributor 9 which may be of any suitable form but as shown is tubular and provided with laterally extending hollow arms 9a having apertures 9b at their ends. Liquid container 10 which is mounted above plate 2 and supported therefrom by means of supports 11, is provided with a centrally disposed downwardly extending tapered portion 12, which is fitted with a needle valve 13 having a handle 14 and is stationary, is journalled in the upper end 9c of distributor 9, which is freely rotatable. The interior of distributor 9 is tapered upwardly as indicated at 9c to prevent leakage from centrifugal action.

In operation, the container 10 being filled with a suitable quantity of liquid and the plate 2 heated to a suitable temperature, the motor is turned on to rotate the fan and distributor and the needle valve adjusted to permit the flow of liquid downwardly into the distributor whence it is distributed through apertures 9b upon the grooved surface 15 of plate 2. The temperature of the grooved surface of the plate is maintained sufficiently high to cause instantaneous vaporization of the liquid which is driven upward by the operation of the fan, whose speed is varied to suit the requirements of dispersion of the vapor, depending on the character of the liquid and the volume to be dispersed.

The grooves 15 not only serve to prevent runoff and waste of liquid not instantly vaporized but increase the hot surface of the plate 2.

Generally speaking successful operation of our machine and method depends upon the maintenance of a balance between the temperature of the plate and the rate of distribution of the material so that approximately 100% of the material will be instantaneously vaporized without residue. This balance depends upon the vapor pressure and viscosity of the material, the speed and degree of uniformity of its distribution upon the plate and the temperature and area of the hot surface.

In practice we have found that satisfactory results are obtained using a motor having a speed of 1520 R. P. M. although with low viscosity materials a higher speed may be used, good results having been obtained at 3500 R. P. M.

The temperature of the hot plate may vary through a range from about 100° F. to 800° F., higher temperatures being preferred for the more oily materials.

In an alternative form of our machine container 17, motor 18 and plate 19 are supported from base 20 and intermediate supports. Plate 19 may be similar in form to plate 2 but as shown is open at the top and closed at the bottom, except that openings 19b are provided in the bottom to permit the exit of vaporized material. To the lower end of hollow, vertically extending shaft 21 of motor 18 is secured rotary pump 22, which is centered upon cylindrical member 23, the lower slotted portion 23a of which engages upwardly extending lug 23b secured to the central interior bottom portion of container 17.

Upon the upper end of shaft 21 is secured hollow tubular distributing member 24 having circumferential, spaced openings 24a therein and angularly disposed blades 25 affixed thereto. The holes 24a are preferably circular and of small diameter, of the order of No. 72 (wire gauge), more or less, and horizontally and vertically spaced. The blades 25 are preferably semi-circular, one blade being positioned slightly behind each opening in the direction of rotation of the shaft. The openings and blades are of such size and so disposed as to provide substantially uniform distribution of material pumped upwardly from container upon the interior surface 19a of plate 19, with respect to which the member 24 is centrally disposed.

Intermediate the member 24 and motor 18 fan 26 is fixed upon shaft 21.

In operation the plate 19 is heated to a suitable temperature, as above stated, and the container 17 being filled with insecticidal material, the motor is started causing rotation of pump 22, fan 26 and distributor 24, forcing material upwardly from container 17 through pump 22, shaft 21, distributor 24 and openings 24a whence it is atomized by operation of the blades 25 and distributed upon the interior surface 19a of plate 19. Vaporizing instantly upon contact with the surface 19a, the insecticidal material is projected outwardly through openings 27 by the operation of fan 26 to form a fog of insecticidal vapor in the surrounding atmosphere.

Having thus described our invention, we claim:

1. A method of vaporizing insecticides or other liquids comprising the steps of atomizing the material to be vaporized, dispersing the atomized material to a surface of a heat conductor maintained at a temperature high enough to cause instantaneous substantially complete vaporization of the material without chemically disintegrating it and without substantial residual deposit upon a surface of the conductor, and projecting the resulting vapor from said conductor into the surrounding atmosphere.

2. A machine for vaporizing insecticides and other liquids comprising a heat conductor having a generally cylindrical interior surface arranged about a vertical axis, said surface being provided with a plurality of grooves extending therearound in generally circumferential relation to said axis, means for heating said conductor, means communicating with a source of supply of insecticide or other liquid for distributing the same upon said surface, and means in communication with said surface for projecting resulting vapor from said surface into the adjacent atmosphere, said surface being so conformed and so arranged in relation to the second mentioned means and the last mentioned means, respectively, that when heated to a suitable temperature it will cause instantaneous substantially complete vaporization of liquid so distributed thereupon without chemically disintegrating it and without substantial residual deposit on the surface, and direct the projected vapor into the adjacent atmosphere whereby to enable the creation of a fog of said vapor in the adjacent atmosphere.

3. A machine as set forth in claim 2 in which the conductor comprises a cylindrical plate closed at one end and provided at its other end with an opening arranged in cooperating spaced relation with the projecting means.

4. A machine as set forth in claim 2, in which the distributing means comprises a power-driven tube adapted to be rotated about one of its ends and having an outlet adjacent its other end and in spaced relation with the said interior surface of the heat conductor.

5. A machine as set forth in claim 2, in which the distributing means comprises a vertically extending tube adapted to rotate about its axis, centrally disposed in relation to said interior surface and having angularly disposed blades affixed to its outer surface, said blades being arranged in vertically spaced relation with one another, and said tube being provided with openings adjacent to said blades, the blades and openings being so conformed and arranged that when liquid is admitted under pressure to said tube while it is being rapidly rotated the liquid will be quickly dispersed to the said interior surface of the heat conductor.

6. A machine for vaporizing insecticides and other liquids comprising a liquid container, a substantially cylindrical heat conductor having a generally cylindrical interior surface arranged about a vertical axis, said surface being provided with a plurality of grooves extending therearound in generally circumferential relation to said axis, means for heating said conductor, means communicating with said conductor for distributing liquid centrifugally upon said interior surface, said distributing means comprising a tube arranged coaxially with said interior surface and having an opening at one end in communication with the container, said tube being adapted to rotate about its axis and having spaced peripheral openings and angularly disposed blades affixed to its outer surface adjacent said openings, the openings and blades being so conformed and arranged that when liquid is admitted under pressure to said tube while it is being rapidly rotated the liquid will be quickly dispersed to the said interior surface of the conductor in atomized form, and means in communication with said interior surface for projecting resulting vapor therefrom into the adjacent atmosphere, said interior surface being so conformed and so arranged in relation to the said distributing means and the said projecting means, respectively, that when heated to a suitable temperature it will cause instantaneous, substantially complete vaporization of liquid so distributed thereon without chemically disintegrating it and without substantial residual deposit on the said interior surface, and direct the projected vapor into the adjacent atmosphere whereby to enable the creation of a fog of said vapor in the adjacent atmosphere.

WILLIAM EDWARD McCAULEY.
CARLOS W. VEACH.